Patented Aug. 16, 1949

2,479,519

UNITED STATES PATENT OFFICE 2,479,519

METHOD FOR RECOVERING CORN OIL AND CORN PROTEIN

Herman H. Schopmeyer, Hammond, Ind., assignor to American Maize-Products Company, a corporation of Maine No Drawing. Application February 24, 1947, Serial No. 730,567

2 Claims. (Cl. 260—412.4)

This invention relates to refined corn protein and the method of making it.

The process of making corn protein that is conventionally used in the corn wet milling industry comprises steeping commercial corn which is ordinarily the yellow variety in water containing sulfur dioxide until the corn is suitable in moisture content and condition for milling. The steeped corn is then milled with attrition and burr mills and the fiber separated from the starch and protein in the milled product.

To separate starch from protein, the mixture in aqueous suspension is caused to flow slowly over a long settling table. The starch, being of greater specific gravity than the protein, settles preferentially on the table. Most of the protein flows with the water over the far end of the table. The unsettled fraction so obtained is a crude protein material that, under best operating conditions, runs about half protein. To raise the content of protein, it has become the established practice in the industry to feed this wet protein material to centrifugal separators. These remove part of the retained starch and increase the protein content to about 65% on the average for different runs, percentages of protein being calculated on the dry basis.

This crude protein from the centrifuges is sometimes hydrolyzed by an acid to remove starch. The starch free product mixed with water, alkali, and resin gives a commercially useful adhesive. The product is useful also as a dispersing agent in paints and in other industrial compositions.

The fields of usefulness of the product are limited, however, by the yellow color, this being the residual color from the yellow corn used initially. A further difficulty is experienced in the occasional spontaneous heating of the dried corn protein so prepared. Stored in burlap bags in contact with air, the material sometimes undergoes charring.

I have now discovered that the crude corn protein which is objectionably colored and subject to spontaneous heating contains a substantial proportion of fatty oil distributed throughout the mass in such form as not to be accessible for thorough extraction with a solvent.

I have discovered a method by means of which the oil may be substantially completely separated, the yield of recovered oil greatly increased, and the intensity of the yellow reduced to a satisfactory level for extended uses of the protein, with the production of a product of excellent storage properties. This method comprises the acid hydrolysis and removal of the soluble products thus formed from the starch followed by extraction of the oil with a solvent. This destarching makes available quantities of the fatty oil that are not extractable before the removal of the starch by the destarching treatment.

Briefly stated, the invention comprises corn protein substantially free from starch and fatty oil and not susceptible to spontaneous oxidation and heating in storage. The invention comprises also the herein described method of making such product, including subjecting crude corn protein material containing the protein, starch, and fatty oil to acid hydrolysis until the starch is converted practically completely to soluble products, removing the soluble products, drying the residue, and extracting the dried residue with a solvent for fatty oil until the oil is substantially completely removed from the remaining thus refined corn protein.

In effecting the acid hydrolysis of the starch and the extraction of the corn oil, conditions and equipment may be employed that are usual except for the order of the steps. It is essential that extraction of oil follow the hydrolysis of the starch even when, as in a modification of the method, the crude corn protein material is dried and extracted with solvent for the fatty oil in advance of the hydrolysis of the starch. In this modification two extractions of the oil are made, one before the acid hydrolysis of the starch and removal of its conversion products, and the other after such hydrolysis and removal and drying of the residue.

In any case the solution of oil resulting from the solvent extraction is subjected to evaporation, to remove the solvent and leave the fatty oil for further refining or use as a crude corn oil.

The refined protein obtained as the main product of my process is useful as an improved adhesive and dispersing agent.

In effecting the hydrolysis of the starch there is used to advantage an aqueous solution of a mineral acid of pH about 0.5 to 2 and preferably about 1.1. Temperatures used are sufficiently elevated to make the rate of hydrolysis rapid but not above the boiling point of the aqueous solution of the acid under the prevailing pressure. Suitable temperatures for the hydrolysis are 95° to 150° C.

The hydrolysis is continued until the starch is converted substantially completely to soluble products as shown by the absence of blue color on adding an iodine solution of kind normally used in testing for starch. An example of such solution is a solution of iodine in an aqueous solution of potassium iodine. The hydrolysis usually requires heating the batch with the acid solution for a period of 1 to 2 hours at 95° to 100° C.

The acid used in making the hydrolysis is suitably hydrochloric, sulfuric, phosphoric, or like mineral acid. Sulfuric and hydrochloric acid are the least expensive and are entirely satisfactory in the hydrolysis.

After the hydrolysis of the starch, an alkaline substance, as, for instance, an aqueous solution of sodium hydroxide, sodium carbonate or potassium hydroxide, is added to the mixture in such proportion as to raise the pH to approximately 3.5 to 5.5 and preferably 4.3 to 4.5, approximately the isoelectric point of the various proteins present.

The solvent used to extract the fatty oils, after the hydrolysis of the starch and attendant exposure of the oil to the extracting medium, is one that is inert chemically with the materials to be extracted, volatile, and effective as a solvent for corn oil. Examples of solvents that meet the requirements and are satisfactory are carbon tetrachloride, hexane, petroleum ether, ether, benzene, tetrachlorethylene and trichlorethylene.

The process will be illustrated in greater detail by description in connection with the following examples. In these examples and elsewhere herein, proportions are expressed as parts by weight unless specifically stated to the contrary.

Example 1

Crude corn protein material from the centrifugal separators, for separating part of the retained starch as described above, serves as the raw material. This crude protein material by analysis was found to contain on the dry basis 61.5% of corn protein and 2.3% of oil extractable by carbon tetrachloride.

A batch of the material without previous extraction of oil was warmed at a temperature of 100° C. with an aqueous solution of hydrochloric acid of concentration to make the pH 1.1, until the starch was completely converted to soluble products as shown by absence of blue color with iodine solution. This required 2 hours.

The mixture was then treated with a solution of dilute aqueous sodium hydroxide serving as an alkaline material to increase the pH to 4.3 to 4.5.

The material so neutralized in part with alkali is then filtered to remove the aqueous solution of soluble starch conversion products. The undissolved corn protein and fatty oil, remaining together on the filter, are washed with water to remove all the conversion products more nearly completely. Thus the residue is resuspended in fresh water in amount to give a proportion of about 20 parts of the suspended mixture to 100 of water. This suspension is filtered and the undissolved material thoroughly washed with water on the filter.

The product is then dried and extracted with carbon tetrachloride, applied in repeated fresh portions and separated, as usual in extraction processes, until practically no more oil is found to dissolve in the last portion of carbon tetrachloride used.

It was found that 100 parts of the dried material contained 70.3 parts of corn protein and on extraction with the carbon tetrachloride gave 8.7 parts of corn oil.

The total residue before the hydrolysis of the starch and before the extraction of the oil amounted to 61 parts for 100 parts dry weight. This means that the total oil recovered by extraction subsequent to the hydrolysis of the starch amounted to 8.7% of 61 or 5.3 parts for 100 parts dry weight of the original crude protein material as against only 2.3 parts which are extractable with a solvent before the hydrolysis and removal of the starch.

On the basis of this result and other results obtained in repeated tests of my process, I conclude that a large part of the fatty oil present in the original crude corn protein material is so associated with the protein and starch mixture as to be isolated or bound, and, therefore, non-extractable by the solvent medium and that, in the acid treatment of the material, the oil so secluded initially is made accessible to and therefore soluble in the extracting solvent.

Example 2

In this example there was used a modified process in which the crude corn protein material of the kind used as the raw material in Example 1 was dried and extracted with carbon tetrachloride prior to the hydrolysis of the starch with acid and then extracted again after the hydrolysis and subsequent drying.

After the first extraction of the crude protein material with carbon tetrachloride, the extracted material was found to contain on the dry basis 62.4% of protein and 0.2% of fatty oil available for extraction in the careful technique of the analytical laboratory method.

The extracted material containing 62.4% of protein and only 0.2% of extractable oil was then destarched by warming with an aqueous solution of mineral acid. The remaining undissolved material was separated from the soluble starch conversion products. The residue was washed with water. These steps were effected as described under Example 1. It was found by extraction that the starch-free residue after being dried contained 4.8% of oil.

The corn used as the original source of the crude corn protein material in the above examples was yellow corn. A large decrease in the intensity of the yellow color of the protein resulted from the extraction.

It will be understood also that it is intended to cover all changes and modifications of the example of the invention herein chosen for the purpose of illustration which do not constitute departures from the spirit and scope of the invention.

What I claim is:

1. In separating oil from crude corn protein material containing corn protein and substantial proportions of starch and corn oil, the method which comprises warming the crude material in contact with an aqueous solution of an acid in concentration to establish the pH at about 0.5 to 2 until the starch is converted to soluble products and the mixture no longer gives a blue color with iodine solution, discontinuing the warming before the corn protein dissolves, this leaving a residue of the protein and oil, then adding an alkaline solution to the resulting mixture in amount to establish the pH at approximately 3.5 to 5.5, separating the said soluble products from the remaining residue of undissolved corn protein and oil, washing with water and then drying the residue, subjecting the dried residue to solvent extraction, and continuing the extraction until the oil is substantially completely removed.

2. The method described in claim 1 which comprises subjecting the crude corn protein material to extraction with a solvent for fatty oil, to remove the originally extractable fatty oil, before subjecting the said material to warming with the acid solution.

HERMAN H. SCHOPMEYER.

REFERENCES CITED

The following references are of record in the file of this patent:

UNITED STATES PATENTS

| Number | Name | Date |
|---|---|---|
| 313,665 | Greene | Mar. 10, 1885 |
| 696,156 | Wulkan | Mar. 25, 1902 |
| 2,384,388 | Monte et al. | Sept. 4, 1945 |